United States Patent [19]

Bidwell

[11] Patent Number: 5,313,797
[45] Date of Patent: May 24, 1994

[54] AN EXHAUST GAS TURBINE POWERED SYSTEM FOR TRANSFORMING PRESSURE INTO ROTATIVE MOTION

[76] Inventor: Howard Bidwell, 120 Maple St., Rm. 207, Springfield, Mass. 01103

[21] Appl. No.: 24,286
[22] Filed: Mar. 1, 1993
[51] Int. Cl.$^5$ .............................................. F02G 1/00
[52] U.S. Cl. ...................... 60/597; 415/115; 415/116; 415/202; 415/208.3
[58] Field of Search .................. 60/597, 614, 619; 415/202, 115, 116, 208.1, 208.3

[56] References Cited

U.S. PATENT DOCUMENTS

| | | | |
|---|---|---|---|
| 3,311,097 | 3/1967 | Mittelstaedt | 123/537 |
| 3,397,864 | 8/1968 | Sprouse et al. | 415/202 |
| 4,604,029 | 8/1986 | Fink | 415/202 |
| 4,864,151 | 9/1989 | Wyczalek et al. | 60/597 |
| 5,114,309 | 5/1992 | Heggelmolen | 415/116 |

Primary Examiner—Richard A. Bertsch
Assistant Examiner—Charles G. Freay
Attorney, Agent, or Firm—Ross, Ross & Flavin

[57] ABSTRACT

A rotary power transformer employing the exhaust gases of an internal combustion engine as the fluid medium for transforming pressure into a rotative motion. It includes a circular housing and a central hollow driven shaft extendable through and rotatable relative to the housing. A central rotor of generally cylindrical shape has a plurality of equispaced vanes on the outer periphery thereof. A rotor boss is nestably received at opposite sides of each vane of the rotor. The rotor side walls are fixed to the driven shaft. An outer stator circumscribes and is in spaced relationship with the rotor for defining a circular expansion chamber between the stator and rotor and has a plurality of equispaced inwardly facing vanes defining on the inboard periphery of the stator.

1 Claim, 2 Drawing Sheets

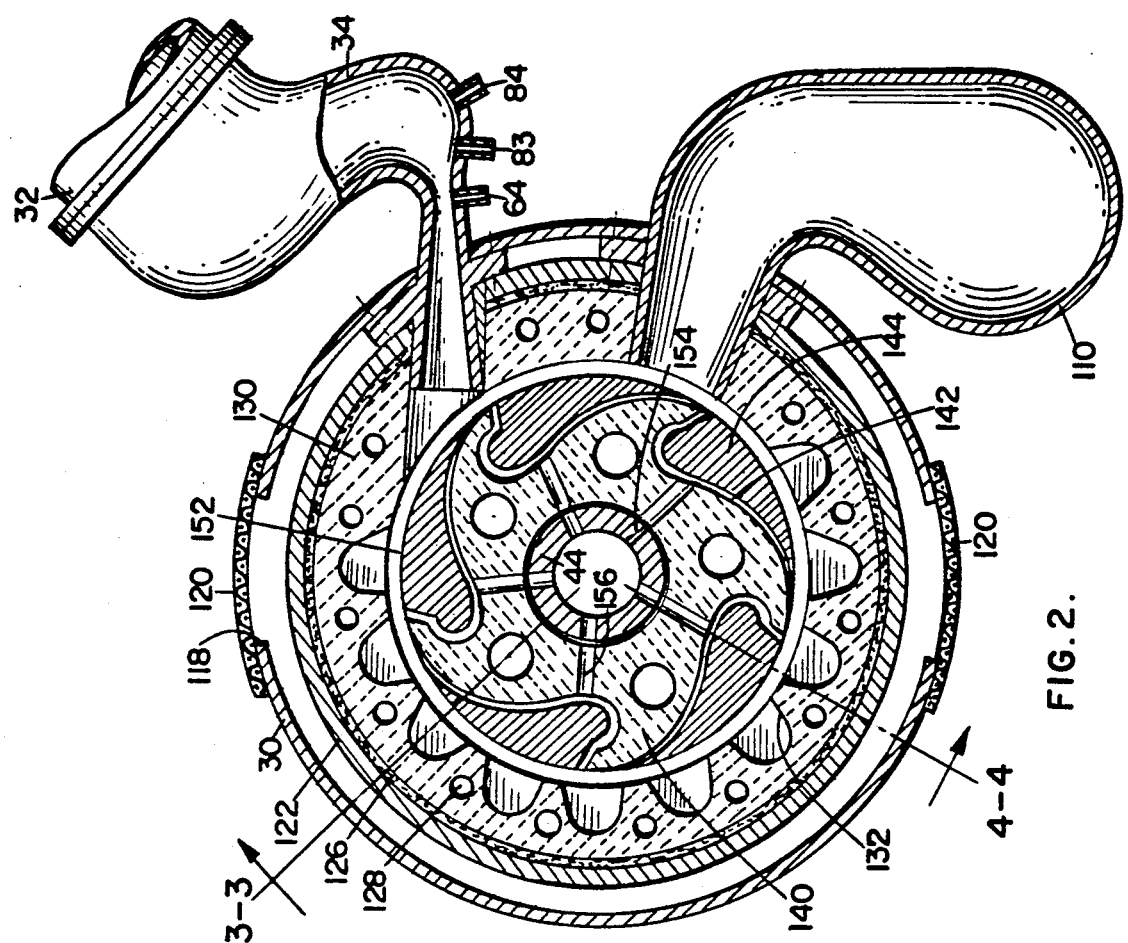
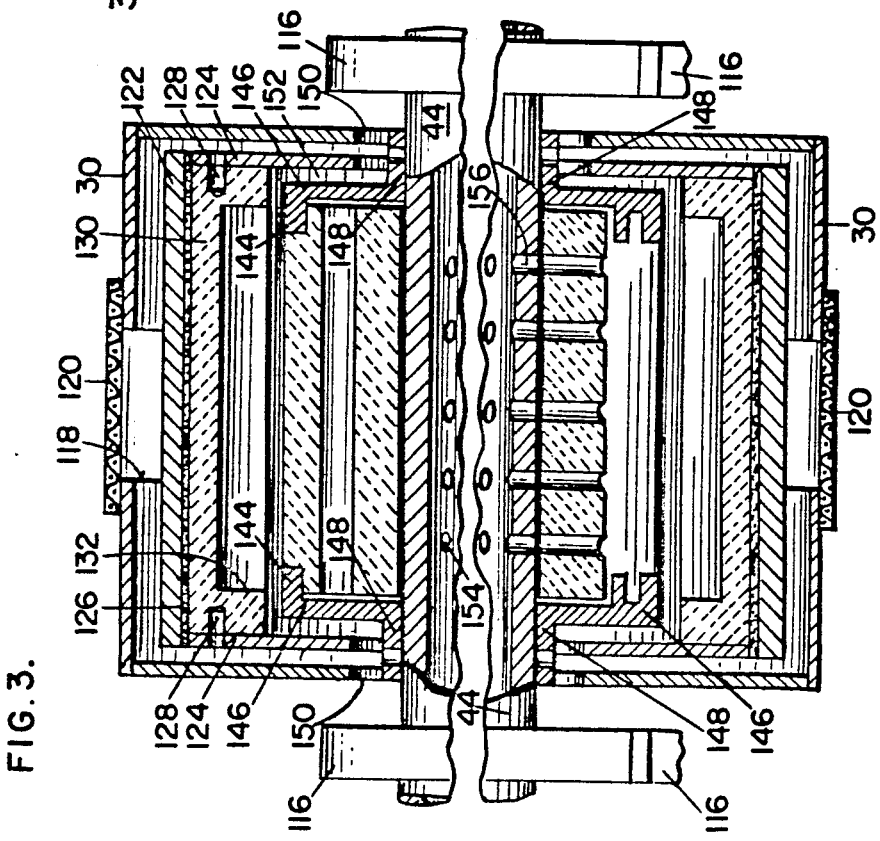
FIG. 2.
FIG. 3.
FIG. 4.

AN EXHAUST GAS TURBINE POWERED SYSTEM FOR TRANSFORMING PRESSURE INTO ROTATIVE MOTION

BACKGROUND OF THE INVENTION

1. Field of the Invention

This invention relates to cogeneration, meaning involvement in the use of the normally spent gases or waste heat emanating from its source: first, reactivating the secondary combustion gas content, for achieving a more complete burning of the unburned hydrocarbons such as carbon monoxide (CO), to carbon dioxide ($CO_2$) of the exhaust emission by feeding fresh air charges into the exhaust flame stream so as to increase energy potential for auxiliary power driving purposes; second, exploiting the so-increased energy derived from the improved secondary combustion resulting from the fresh air propagated and supported intensified secondary combustion and resulting increase in gas volume and velocity magnitudes by which to drive an air-cooled air-charging turbo type power-generating rotor and its extended hollow air-cooled supporting shaft and additional auxiliary accessory apparatus linked thereto, and third, propelling a carbureted air-fuel vapor mixture for delivering a conditioned engine intake flow under increased and above atmospheric pressures.

It teaches improvements in the design and construction of engine exhaust turbines for extracting the maximum amount of energy, wasted in conventional practice, from the flaming gas exhaust as discharged during a normal engine work-load-speed operation.

It exploits the energies emanating through the exhaust manifold of an internal combustion engine while altering the content of the gases so as to contribute to the reduction of air pollution while simultaneously improving engine efficiency.

Auxiliary fresh air and other oxidizing gases are blended with the exhaust gases whereby the carbon monoxide content is significantly reduced within the exhausted fumes while the carbon dioxide content thereof is appreciably maximized.

The invention teaches new and novel improvements and innovations, not heretofore disclosed, same exemplifying additional embodiments for obtaining maximum energy extraction and other operational benefits with respect to improving the efficiency of internal combustion engines.

2. Description of the Prior Art

Efforts on the part of major automobile manufacturers to reduce pollutants in the exhaust gases of conventional gasoline piston engines for use in motor vehicles are well known and consist primarily in investigating or developing a system or combination of systems such as the use of a thermal reactor, catalytic converter, nitrogen oxide catalytic converter, exhaust gas recirculation, air injection, etc. Since catalytic converters are vulnerable to leaded fuels, and for other reasons, the use of thermal reactors to reduce exhaust emissions has been considered promising.

With the exception of equipment using engine exhaust to propel air-fuel intake mixtures by exhaust-driven turbo type superchargers, and using heat extracted for use similar to that used in the Pogue and other type carburetors and devices, no method or means is known to exist for the amplification of, or otherwise the increase of, the energy content of the engine exhaust emissions as to be made useful and applicable for auxiliary power driving purposes for improving overall engine efficiency.

No practical means is known for economically improving the quality of the exhaust emissions regardless of the fuel used by the feeding into the exhaust emission additional oxidizing agents such as air and/or oxygen, by which to increase the potential energies of those emissions for power-take-off purposes and for use in generating engine intake fuel gases, such as hydrogen and oxygen, to increase engine efficiency and simultaneously reduce pollution.

In most conventional types of liquid fuel fed internal combustion engines, there exists little or no possibility of obtaining complete combustion within the cylinder confines. The liquid fuel is seldom sufficiently fully gasified or the usual carbureted liquid vapor part of the air-liquid vapor mixture is seldom sufficiently fully gasified so as to be completely ignitable within the engine.

I am aware of a patent to G. S. Mittelstaedt, U.S. Pat. No. 3,311,097 of Mar. 28, 1967, showing the use of apparatus for producing hydrogen and oxygen gases for use in the intake, combustion and exhaust zones of an internal combustion engine.

SUMMARY OF THE INVENTION

The invention maximizes the gasification of the engine intake mixture in a manner never before realized, same being accomplished in part by the improvement of the quality of the engine exhaust mixture.

Here is a method of, and apparatus for, controlling a sequential series of functions by means of a plurality of interrelated components, all wherein the pressure and volume of a flow of a supercharged air/fuel mixture to the intake manifold is at a rate in consonance with the volume of the flows of hydrogen and oxygen separately delivered to the intake manifold. The flows are at rates in accordance with the rate at which either the hydrogen or oxygen, or both, are generated by an automatically-responsive gas generator. An electric D.C. current generator (of the low voltage, high amperage type) is mounted upon and driven by a hollow, air cooled, driven shaft of a turbine energized by the engine exhaust flame.

The quantity of the air/fuel mixture fed to the intake manifold is automatically varied in accordance with the quantity of hydrogen alone or the quantities of hydrogen and oxygen automatically fed to the intake manifold, all without other regulating means, save for the usual throttle for effecting engine load and speed conditions.

Appreciating the highly pressurized velocity flow rate of such exhaust gases and the high temperature thereof, allows exploitation by augmenting same with auxiliary flows of fresh air so as to facilitate a more complete burning of any unconsumed gaseous portions of the exhaust gases with a resultant and favorable change of the carbon monoxide-carbon dioxide ratio.

Advantageously, my teachings are without the necessity for any modifications in the air filter, carburetor or fuel injection systems.

Additionally I teach methods and means for generating steam from the heat, which is normally wasted, by which I am able to reduce fuel intake consumption regardless of the composition of the fuel used, such as conventional gasoline, leaded or unleaded or diesel type fuels, or blends thereof.

Also I teach fundamental concepts in the use of steam as generated from the normally-wasted heat, so as to improve the in-cylinder combustion.

BRIEF DESCRIPTION OF THE DRAWINGS

FIG. 2 is a vertical sectional view of one type or form of my exhaust turbine rotor for use with typical multicylinder internal combustion engines used in passenger vehicles and light pick up trucks;

FIG. 3 is a sectional view on the line 3—3 of FIG. 1;

FIG. 4 is a sectional view on the line 4—4 of FIG. 1

DESCRIPTION OF THE PREFERRED EMBODIMENT

Figure 1:
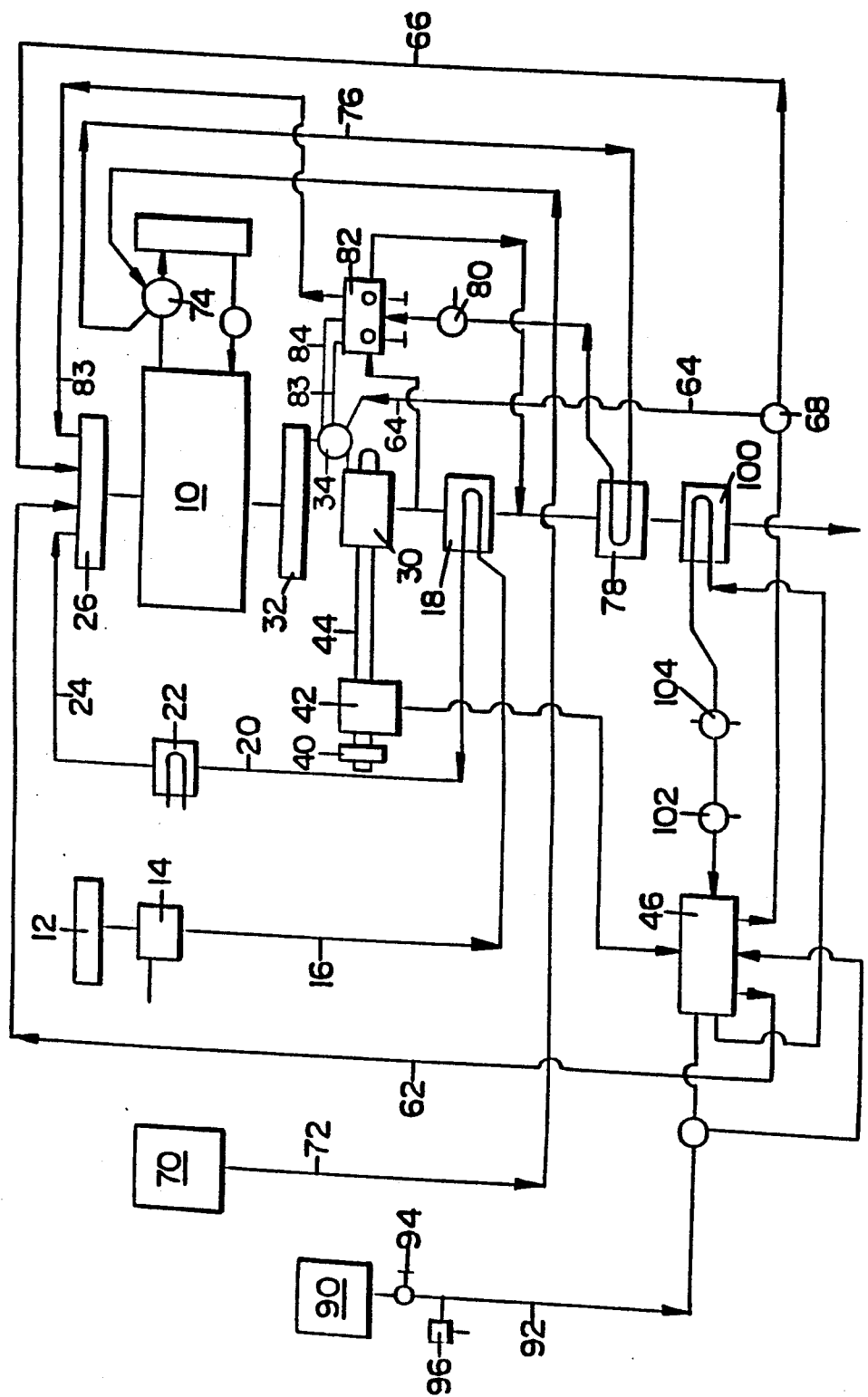
FIG. 1 is a schematic flow-line diagram showing the operatively-interconnected components illustrating the basic principles of the invention.

Internal combustion engine 10 is shown which normally draws air via air filter 12 and a fuel mixture via carburetor 14. The admixed air-fuel combination is passaged via conduit 16 to exhaust-gas heat exchanger 18 where it is heated to a gaseous state preliminary to passage through conduit 20 through cooler 22 before passage via conduit 24 to intake manifold 26.

By virtue of the gasification of the carbureted mixture, same enters the engine cylinders in an instantaneous explosive state ready for compression, and 100% firing at ignition.

To reclaim the maximum of energy from the exhaust, an exhaust turbine rotor 30 is directly connected to exhaust manifold 32, via a conduit and venturi coupling 34, by which means, the exhaust gas flow velocities are greatly intensified, such being directed against turbine vaning, impinging thereon.

Exhaust turbine rotor drives low voltage, high amperage DC generator 42, being direct-driven by hollow, air-cooled driven shaft 44, for the energizing of hydrogen-oxygen gas generator 46.

A synergistic effect is defined in-that any increase in the speed of rotor rotation leads to a simultaneous increase in the electric current generation with an in-turn increase in the hydrogen and oxygen generation.

Speed limitation device 40 is located on drive shaft 44, outboard of generator 42.

When engine 10 is started and while idling during initial low speed warm up, a minimum of electric current is generated. Accordingly, a minimum of hydrogen and oxygen are generated. Under normal load throttle, the increase in exhaust flame intensity leads to an increase in the supercharging effect and, accordingly, an increase in the development and volume of consumption of the gaseous mixtures.

Hydrogen gas developed by generator 46 flows via conduit 62 to engine intake manifold 26.

Oxygen is fed both to venturi coupling 34 via conduit 64 and to intake manifold 26 via conduit 66 as strategically proportioned by two-way valve 68.

Regardless of the distribution of the gases, it is axiomatic that the greater the volumes of the gases generated and consumed, the greater the reduction of the volume of air/fuel mixture required to be fed to the intake as provided for by the bypassing of a portion of the supercharged discharge volume in accordance with the volume of flow of the hydrogen and oxygen. An equilibrium is eventually reached in the case of each condition of operation.

The more electrical energy fed to the gas generator, the more gases are generated for feeding to the intake manifold and/or the exhaust outlet.

A water trickle drawn from water reservoir 70 via conduit 72 flows to engine block cooling water heat exchanger 74, thence via conduit 76 to exhaust pipe heat exchanger 78, and then to temperature regulator 80, from which it flows to two-way hydraulic steam engine adjustable lubricator 82 for feeding steam to the venturi coupling via conduit 83 and droplets of a lubricant containing a mixture of magnesium powder and graphite powder, the quantities of magnesium and graphite powders being varied with respect to the engine-load service involved.

The magnesium and graphite-fortified-oil may be variously adjusted and directed for feeding into the engine intake manifold 26 via line 83' and also separately and simultaneously into venturi coupling 34 via line 84.

Powdered magnesium acts only slightly with pure water, even at 100° F. temperature, but when heated in a current of steam, it takes fire.

Because magnesium fire within an engine cylinder and/or within the exhaust creates so much more heat than is found in any conventional systems, a flow of steam therewith is necessary, not only to fully satisfy the affinity of the magnesium fire reaction, but also to absorb the excessive heat which burns away all the oil lubrication during the firing episode of the magnesium.

Magnesium powder does not rapidly mix with water, but readily mixes with a lubricating oil, preferably A.S.M.E. grade 40, so as to hold both the magnesium and graphite powders in suspension. Lubricator 82 is fitted with a means for heating and agitating the compounded magnesium-graphite oil mixture during engine operation, with the lubricator being suitably vented.

The lubricant is pre-formulated with a tallow for obtaining good adherence to the engine cylinder wearing surfaces.

Standard colloidal magnesium and fine 50 mesh powdered graphite blended into the oil and regulated by timing the lubricating oil drop flow rate at the lubricator standard sight feed, makes it easy to adjust the proper rate of drop count to engine tone.

Operation under load may vary more or less from 3 to 4 grams of magnesium to 5 gallons of engine fuel for light automotive purposes. For heavy duty railroad, marine, stationary and trucking service, a different lubricator drop rate flow may be required, as noted at the sight feed.

Steam may be passaged directly to the engine intake and to exhaust manifold 32 where the condensed steam is flashed into super heated steam within the flaming exhaust gases in the venturi. The steam in its superheated state absorbs the intense heat of the magnesium fire.

The advantage of this type of application is in the easy lubrication feed rate adjustment under load on a particular type service.

The method of feeding water from a reservoir 90 via a conduit 92 and through a magnetic shut-off valve 94, for maintaining constant electrolyte level within the hydrogen-oxygen gas generator 46, by virtue of magnetic control valve 96, is controlled also by an ignition switch to allow the electrolyte of generator 46 to be circulated through exhaust heat exchanger 100 via a circulating pump 102 and an electrolyte temperature regulator 104, by which the capacity of generator 46 may be materially increased due to the electrolyte being maintained at a regulated elevated suitable temperature during engine operation.

The water-alcohol mixture reservoir 70 supplies a low flow to heat exchanger 74 for reclaiming the heat normally wasted from the engine block cooling system.

The water-alcohol mixture is then directed to down stream exhaust pipe heat exchanger 78 for reclaiming additional heat from the engine exhaust flow which is also normally wasted.

The so-heated water-alcohol mixture flow being maintained during engine load operation to a variable desired near steam flash-point temperature as maintained by regulator 80, the so-heated liquid flow being variably volume-wise selectively divided by the dual outlets, whereby the magnesium-graphite mixture may be adjustably added to the flow leaving via the conduit directed to intake manifold 26 from feeder lubricator 82, while a powdered magnesium liquid feed flow is added to the engine exhaust manifold 32, the separately enriched outlet flows from lubricator feeder 82 being separately hand set by volume control needle valves and sight view indicators located within lubricator 82. Additional exhaust heat may be used to heat the lubricator-feeder 82, by a separate exhaust gas flow circuit, while oxygen gas from gas generator 46 is being directed into the engine exhaust flow turbine to turbine rotor within exhaust turbine rotor housing 30, thereby adding additional heat to the lubricant feed flow.

Any overspeed of the rotor would trip an engine start-stop switch in the event electric generator 42 should fail for any reason during load operation.

The disclosed rotor or turbine functions to induce auxiliary cool fresh air into and blending with the flame flow of the gases of the engine exhaust.

An outer steel housing or jacket 30 of substantially circular configuration is provided with suitable openings for the insertion therethrough and attachment thereto of a generally tubular engine exhaust turbine inlet which is in the form of a venturi 34 suitably coupled or interconnected to the outboard terminus of the exhaust leading from the engine and of a generally tubular turbine outlet suitably interconnected to an exhaust pipe 110 for leading the waste gases to atmosphere.

Open ended hollow air conducting driven shaft 44 is mounted centrally of and extendable through rotor housing 30 suitably journalled at opposite sides of and outboard of the housing an anti-friction bearings in pillow blocks 116, which blocks may be strategically secured to engine 10.

Rotor housing 30 is slotted at 118 for the introduction thereinto of cool, ambient air which slottings may be covered with screening 120.

Spaced inwardly of rotor housing 30 is a circular stator shell 122 which is supported in a stationary position by a pair of opposite side walls 124. The inner wall of the stator shell is lined with an asbestos layer 126.

A reaction vaned outer stator 130 is provided with a plurality of equispaced pockets 132.

The stator is formed from a high heat resistant porcelain designed for withstanding the rapid temperature changes from cold, non-operating condition to hot full work-load condition, with the exhaust venturi 34 being in contact therewith and extending therethrough.

Stator 130 is held to opposite side walls 124 by pins 128.

A single piece multi air channel inner rotor 140 is formed from a high heat resistant or porcelain equivalent material and is air cooled by outside air passing through the open ended driven shaft whereby the rotor is allowed to expand shaft wise and radially between rotor side walls or end flanges 146 which are fixed to the driven shaft at each side of the rotor.

Inner rotor ring 140 is designed with a plurality of equispaced pockets 142 in each of which is seated a vane 144 at each side of the rotor, the vane being an inwardly projecting protuberance.

Each rotor side wall or end flange 146 is provided with a leg 148 which is fixed to the driven shaft, all whereby the shaft is driven.

Ample circular clearance is provided between the stator and rotor to allow for the expansion of the gases flowing therethrough.

Ambient air is drawn into the housing through the open-ended hollow driven shaft and is passed radially outwardly through the rotor via slots 154 in the driven shaft and aligned slots 156 in the rotor for charge into respective rotor pockets.

The rotor is cooled by the air flow within the driven shaft, but the rotor not being directly secured to the shaft thus allows the rotor to expand shaftwise and radially between the opposite metallic end flanges which are secured to the driven shaft.

Each housing side wall is provided with an opening 150 which allows entry of ambient air into the passageway and also through a strategically provided opening in each stator side wall and thence into provided space 152 between stator and rotor.

The rotor design will be adapted to the engine type involved, be it the common passenger type vehicle, truck, or van of the pickup or dump type, of the two cycle or four cycle, Otto or Diesel, single or multicylinder design.

Each pocket is individually air cooled while under the continuing blast of the flaming exhaust gas, which flow is crosswise relative to the rotor axis.

The magnesium powder is drawn into the rotor housing by the suction effect of the venturi while a flow of low pressure steam is also drawn, simultaneously into the flow of the exhaust gas flow thereby causing the magnesium fire to be impelled against the vaning of the rotor.

While the conventional engine exhaust manifold may glow at a red heat under normal engine load, the use of magnesium "fire" within the engine cylinder and also within the venturi coupling may cause exceptionally hot venturi surfaces requiring special metals.

Because of the extremely high heat generated in the feeding of magnesium powder within both the engine cylinders and within the venturi coupling requiring steam in both instances, the internal combustion engine equipped as herein exemplified becomes more truly as much a super heated steam powered engine in its own right and only part gas engine, for the reason steam generated by engine exhaust heat is required to generate magnesium "fire" that more than doubles the engine power output with a large reduction of engine fuel intake with half the number of cylinders, in which the super heated steam so created greatly adds to the engine output capacity It is to be noted that steam generated by engine waste heat is required to absorb the extreme high magnesium "fire" heat that generates highly superheated steam, both within the engine cylinders and also within the engine exhaust venturi plus the exhaust turbine which drives the electric generator that energizes the hydrogen oxygen gas generator, that reduces engine fuel intake due to the hydrogen and oxygen gases fed directly into the engine intake, which with the added energy of the exhaust venturi, the so equipped interal combustion engine becomes more justly called an internal combustion steam engine since the gas burning cylinders become steam generators with only half the number being required per given power output.

Since with the magnesium powder feeding within the engine cylinders and the engine exhaust turbine the engine exhaust turbine may produce as much power as three or four conventionally operated cylinders, thus causing a revolution in internal combustion engine design with less dependency on the shrinking world petroleum oil and fuel supply.

An exhaust turbine may recover more energy from the engine exhaust than three or four cylinders may develop, when additionally fed magnesium "fire" and engine exhaust generated steam. The steam in excess of that required in generating magnesium "fire" reaction absorbs excess heat in the form of superheated steam that greatly increases the engine power output and the engine efficiency.

Waste heat generated steam is formed from a trickle flow of water from an add-on water reservoir 70 via conduit 72 to cylinder block cooling water heat exchanger 74 to down stream engine exhaust heat exchanger 78 to temperature regulator 80 to dual distributor regulator 82 by which a variable part of the so-generated steam may be directed to the engine intake, with the balance directed to the engine exhaust manifold 32 where the low pressure steam is rapidly flashed into superheated steam within the hot flaming engine exhaust gases fed by venturi coupling 34 into engine exhaust turbine 30 that indirectly propels low voltage high amperage special electrical generator 42, that automatically energizes the special novel type hydrogen-oxygen gas generator 46 during engine workload operation.

In this flowline arrangement, low pressure steam absorbs the intense high heat of the magnesium "fire".

To extract a maximum of the heat energy from the exhaust, the exhaust turbine is direct-coupled to the engine exhaust manifold outlet with no intervening duct other than the venturi type coupling which allows an increase in the impingement of the exhausted gas against the vaning of the turbine rotor in a crosswise to axis manner for attaining a maximum indirect thrust effect, which is intensified by the exhaust heated water sucked into the exhaust gas flow stream at the venturi narrow section, by which means the so-heated water flashes into super heated steam that further increases the velocity impingement against the vaning of the turbine rotor.

To further increase the velocity of the exhaust flow, the heated water is fortified with a variable amount of a magnesium powder-oil mixture so as to accelerate the exhaust gas velocity as discharged from the venturi due to the magnesium fire, thereby increasing the thrust against the turbine rotor and in turn increasing the electric current for increasing the hydrogen and oxygen generation in the exhaust-driven, high amperage, low voltage DC current electric generator.

The hydrogen is fed directly into the engine air intake manifold without any regulating controls. The oxygen is simultaneously fed directly into the engine exhaust gas stream flow, also without any regulating controls, via the exhaust venturi connection wholly within the exhaust turbine rotor housing coupling connection by which all unburned carbon monoxide gas is burned to maximum carbon dioxide gas.

At least a $\frac{1}{8}''$ clearance is held between rotor vane diameter O.D. and stator I.D. wherefor the rotor always has a radial clearance.

Under maximum speed and full load operation, the shaft end flanges are provided with an inward perimeter flange that receives the vanes centrifugal thrust force thus relieving the drive pins of that stress.

The rotor is cast as a solid one piece, with a larger I.D. bore on both sides of the center splined bored section, to cause outside cooling air to be drawn into the rotor larger I.D. spaces for permitting air flow through the rotor ports.

The multiplicity of air ports at the mid rotor section draws cooling outside air from the hollow drive shaft during rotor normal load operation.

It is to be also noted that outside cooling air is continuously caused to flow-in housing outside jacket enclosure at its near full circular open vent which cools the rotor housing with a flow of air that is also drawn into the rotor hub thence air circulating ports in a heated condition from cooling rotor interior thence blended into the hot exhaust gases during engine load operation.

It is also to be noted that outside air is also drawn into the rotor interior via the wide open ports of both the rotor side end I.D. bores, via the stator vaning side opening and housing enclosure port all at the shaft sleeve level open intake ports during load operation.

The stator vaning may be of cast iron or porcelain or other high temperature resisting material in monolithic form, and of one piece or in sections.

FIG. 1 shows the rotor housing exhaust outlet to be fitted to the turbine rotor housing shell in part and to the venturi inlet in part by normal welding procedure or otherwise to obtain a rotor exposure to the exhaust flame blast of only approximately 15°, which within the turbine rotor housing that provides 325° of thrust travel of the expanding gases within the exhaust turbine rotor housing.

Considering that a conventional 4 cycle piston gets only one thrust in 4 strokes, and a two cycle piston only one thrust in two strokes, herein each of the vanes of this invention gets a strong thrust from the venturi each revolution plus an expansion kick from each of the stator vanes.

Then considering the non-conventional steam energy in-cylinder thrust, the high temperature steam gives a piston thrust further intensified by magnesium fire, not only in the engine cylinder, but also duplicated continuously within the exhaust turbine housing where the steam-magnesium fire energy force to mechanical force converted to electrical to hydrogen-oxygen gas generation and combustion energy, that conventional practice lacks.

I claim:

1. In a power cogenerator for exploiting the exhaust gases of an internal combustion engine emating from the outboard terminus of the engine exhaust as the fluid medium for transforming pressure into a rotative motion, the combination of:

a closed circular housing having a cylindrical chamber and being slotted for the passage thereinto of ambient air, an open-ended hollow air-conducting driven shaft being extendable through and centrally of the housing with openings therein for the passage of ambient air from within the driven shaft to the housing interior, bearings on opposite sides and outboard of the housing for journalling the driven shaft in rotative motion relative to the housing, a circular stator disposed inwardly of and circumadjacent the housing and provided with a plurality of equispaced inwardly-facing pockets, a stator side wall on each side of and connected to the stator and extending toward the driven shaft, a turbo-type power-generating inner rotor of generally cylindrical shape circumscribing the driven shaft, a plurality of equispaced outwardly-facing pockets on the rotor, a vane nestably seated in each pocket of the rotor and extending laterally across the rotor width, a rotor side wall on each side of the rotor and extending toward the driven shaft and being fixed thereto, each vane being fixed to the respective rotor side wall at each extremity thereof for the driving of the driven shaft, the stator circumscribing and being in a spaced relationship with the rotor for defining a circular expansion path between the stator and rotor, an inlet opening in the housing for the inlet of engine exhaust gases into the circular expansion path between the stator and rotor, an exhaust venturi coupled to the outboard terminus of the engine exhaust and the inlet opening, a discharge opening in the housing for the outlet of engine exhaust gases from the circular expansion path, means for feeding ambient air into the housing and through the driven shaft.

* * * * *